(12) United States Patent
McNeil et al.

(10) Patent No.: US 10,107,701 B2
(45) Date of Patent: Oct. 23, 2018

(54) PRESSURE SENSOR WITH DIFFERENTIAL CAPACITIVE OUTPUT

(71) Applicant: FREESCALE SEMICONDUCTOR, INC., Austin, TX (US)

(72) Inventors: Andrew C. McNeil, Chandler, TX (US); Yizhen Lin, Cohoes, NY (US)

(73) Assignee: NXP USA, Inc., Austin, TX (US)

( * ) Notice: Subject to any disclaimer, the term of this patent is extended or adjusted under 35 U.S.C. 154(b) by 383 days.

(21) Appl. No.: 15/051,275

(22) Filed: Feb. 23, 2016

(65) Prior Publication Data

US 2016/0169760 A1   Jun. 16, 2016

Related U.S. Application Data

(62) Division of application No. 13/598,763, filed on Aug. 30, 2012, now Pat. No. 9,290,067.

(51) Int. Cl.
*G01L 9/00* (2006.01)
*G01L 9/12* (2006.01)
*B60C 23/04* (2006.01)

(52) U.S. Cl.
CPC ........ *G01L 9/0072* (2013.01); *B60C 23/0408* (2013.01); *G01L 9/12* (2013.01)

(58) Field of Classification Search
CPC ... G01L 9/0044; G01L 9/0072; G01L 13/025; G01L 13/026; G01L 15/00
USPC ...................................... 73/146.5, 718, 724
See application file for complete search history.

(56) References Cited

U.S. PATENT DOCUMENTS

| 4,945,765 A | 8/1990 | Roszhart |
| 5,528,939 A | 6/1996 | Martin et al. |
| 6,325,354 B1 | 12/2001 | Hoen et al. |
| 6,426,239 B1 | 7/2002 | Gogoi et al. |
| 6,631,641 B1 | 10/2003 | Schalk et al. |

(Continued)

FOREIGN PATENT DOCUMENTS

| CN | 1257194 A | 6/2000 |
| CN | 102265129 A | 11/2011 |

(Continued)

OTHER PUBLICATIONS

Kolle, C., et al., "Ultra Low-Power Monolithically Integrated Capacitive Pressure Sensor for Tire Pressure Monitoring", Proceedings of IEEE Sensors, Oct. 24-27, 2004, vol. 1, pp. 244-247.

(Continued)

*Primary Examiner* — Peter Macchiarolo
*Assistant Examiner* — Alexander Mercado

(57) ABSTRACT

A MEMS pressure sensor device is provided that can provide both a linear output with regard to external pressure, and a differential capacitance output so as to improve the signal amplitude level. These benefits are provided through use of a rotating proof mass that generates capacitive output from electrodes configured at both ends of the rotating proof mass. Sensor output can then be generated using a difference between the capacitances generated from the ends of the rotating proof mass. An additional benefit of such a configuration is that the differential capacitance output changes in a more linear fashion with respect to external pressure changes than does a capacitive output from traditional MEMS pressure sensors.

3 Claims, 5 Drawing Sheets

(56) References Cited

U.S. PATENT DOCUMENTS

| | | |
|---|---|---|
| 6,935,175 B2 | 8/2005 | Eskridge et al. |
| 7,210,352 B2 | 5/2007 | Foster et al. |
| 7,721,604 B2 | 5/2010 | Pruetz |
| 8,020,443 B2 | 9/2011 | Lin et al. |
| 8,171,793 B2 | 5/2012 | Foster |
| 8,186,221 B2 | 5/2012 | Lin et al. |
| 8,220,330 B2 | 7/2012 | Miller et al. |
| 8,539,836 B2 | 9/2013 | McNeil |
| 8,555,719 B2 | 10/2013 | McNeil et al. |
| 8,806,940 B2 | 8/2014 | Classen |
| 8,925,384 B2 | 1/2015 | McNeil et al. |
| 9,134,189 B2 | 9/2015 | Hata et al. |
| 9,143,870 B2 | 9/2015 | Liu et al. |
| 9,190,937 B2 | 11/2015 | Lin et al. |
| 2004/0215406 A1 | 10/2004 | Hoen et al. |
| 2005/0109109 A1* | 5/2005 | Eskridge ............. G01P 15/0802 73/514.32 |
| 2010/0107763 A1* | 5/2010 | Lin .................. G01P 15/125 73/514.32 |
| 2010/0242600 A1* | 9/2010 | Lin .................. B81B 7/0074 73/504.12 |
| 2010/0242603 A1* | 9/2010 | Miller .................. B81B 7/02 73/514.32 |
| 2011/0126632 A1 | 6/2011 | McNeil et al. |
| 2012/0186346 A1* | 7/2012 | McNeil ................ G01P 15/125 73/514.32 |
| 2012/0186347 A1* | 7/2012 | McNeil ................ G01P 15/125 73/514.32 |
| 2013/0047726 A1 | 2/2013 | Lin et al. |
| 2013/0233086 A1* | 9/2013 | Besling ................ G01L 9/0073 73/724 |
| 2013/0319117 A1* | 12/2013 | McNeil ................ G01P 15/125 73/514.32 |
| 2014/0133685 A1* | 5/2014 | Liu .......................... H04R 7/20 381/355 |
| 2014/0137670 A1* | 5/2014 | Hata ..................... G01L 1/144 73/862.621 |
| 2014/0217929 A1* | 8/2014 | Lin ....................... H02N 1/006 318/116 |

FOREIGN PATENT DOCUMENTS

| | | |
|---|---|---|
| CN | 103154746 A | 6/2013 |
| CN | ZL201310388997.8 | 12/2017 |
| GB | 552709 | 8/1941 |
| GB | 552709 A | 4/1943 |
| GB | 2478613 A | 9/2011 |
| KR | 1020090058935 A | 6/2009 |
| WO | 2012052238 A1 | 4/2012 |

OTHER PUBLICATIONS

Ya, M., "Novel MEMS Fully Differential Capacitative Transducer Design and Analysis", May 19-11, 2011, pp. 1-4, 2011 4th International Conference on Mechatronics.

* cited by examiner

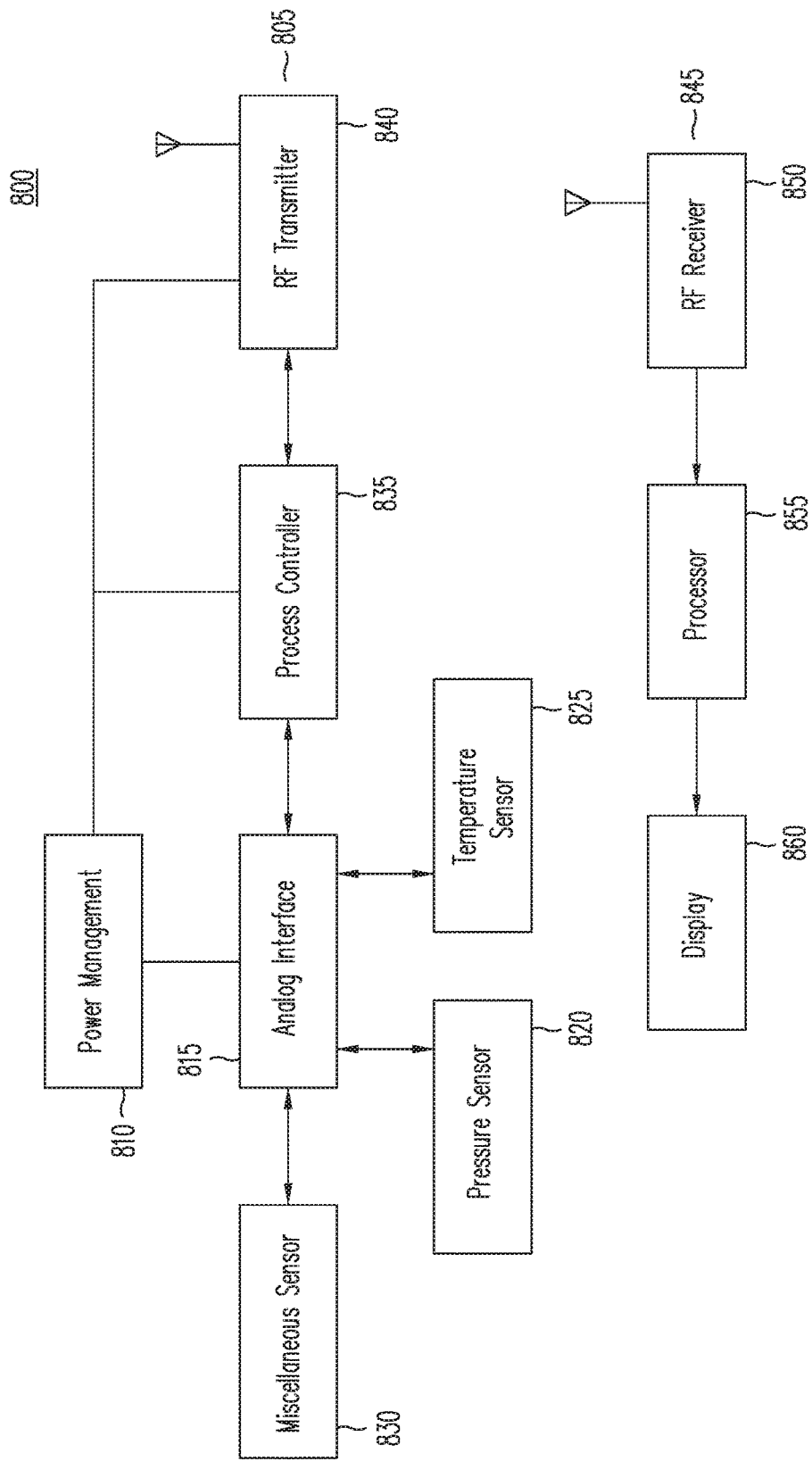

PRESSURE SENSOR WITH DIFFERENTIAL CAPACITIVE OUTPUT

RELATED APPLICATION

This application is a divisional of co-pending U.S. patent application Ser. No. 13/598,763, filed on Aug. 30, 2012.

BACKGROUND

Field

This disclosure relates generally to pressure sensors, and more specifically, to a pressure sensor having a "teeter totter" design that provides a differential capacitive output signal.

Related Art

Modern vehicles are increasingly using sensors to determine whether there is adequate air pressure in the vehicle's tires. Direct tire pressure monitoring using in-tire pressure sensors with a radio frequency (RF) data link are typically used to measure tire pressure.

In one type of tire pressure monitoring system (TPMS), a micro-electromechanical systems (MEMS) pressure sensor device configured to sense a pressure stimulus that is external to the MEMS pressure sensor device is utilized. Such MEMS pressure sensor devices measure pressure changes capacitively, using a diaphragm exposed to the external environment as one electrode of a sense capacitor with the other electrode of the sense capacitor being fixed. In this manner, the diaphragm deforms as external pressure changes, thereby changing the capacitive signal. One drawback of such a system is that changes in the signal are non-linear due to the inverse relationship between capacitance and the distance between capacitor plates. Another drawback of such system is that the output signal is weak compared to other types of MEMS sensors that provide a differential capacitance output.

It is therefore desirable to have a pressure sensor device that provides a more linear output signal in relation to external pressure changes, and that the output signal be derived from a differential capacitance so as to increase the signal level.

BRIEF DESCRIPTION OF THE DRAWINGS

The present invention may be better understood, and its numerous objects, features, and advantages made apparent to those skilled in the art by referencing the accompanying drawings.

FIG. 8 is a simplified block diagram illustrating a tire pressure monitoring system 800, usable with embodiments of the present invention.

The use of the same reference symbols in different drawings indicates identical items unless otherwise noted. The figures are not necessarily drawn to scale.

DETAILED DESCRIPTION

Embodiments of the present invention provide a MEMS pressure sensor device that can provide both a linear output with regard to external pressure, and a differential capacitance output so as to improve the signal amplitude level. Embodiments of the present invention provide these benefits through the use of a rotating proof mass (e.g., a "teeter totter") that generates capacitive output from electrodes configured at both ends of the rotating proof mass. Sensor output can then be generated using a difference between the capacitances generated from the ends of the rotating proof mass. An additional benefit of such a configuration is that the differential capacitance output changes in a more linear fashion with respect to external pressure changes than does a capacitive output from traditional MEMS pressure sensors.

Figure 1:
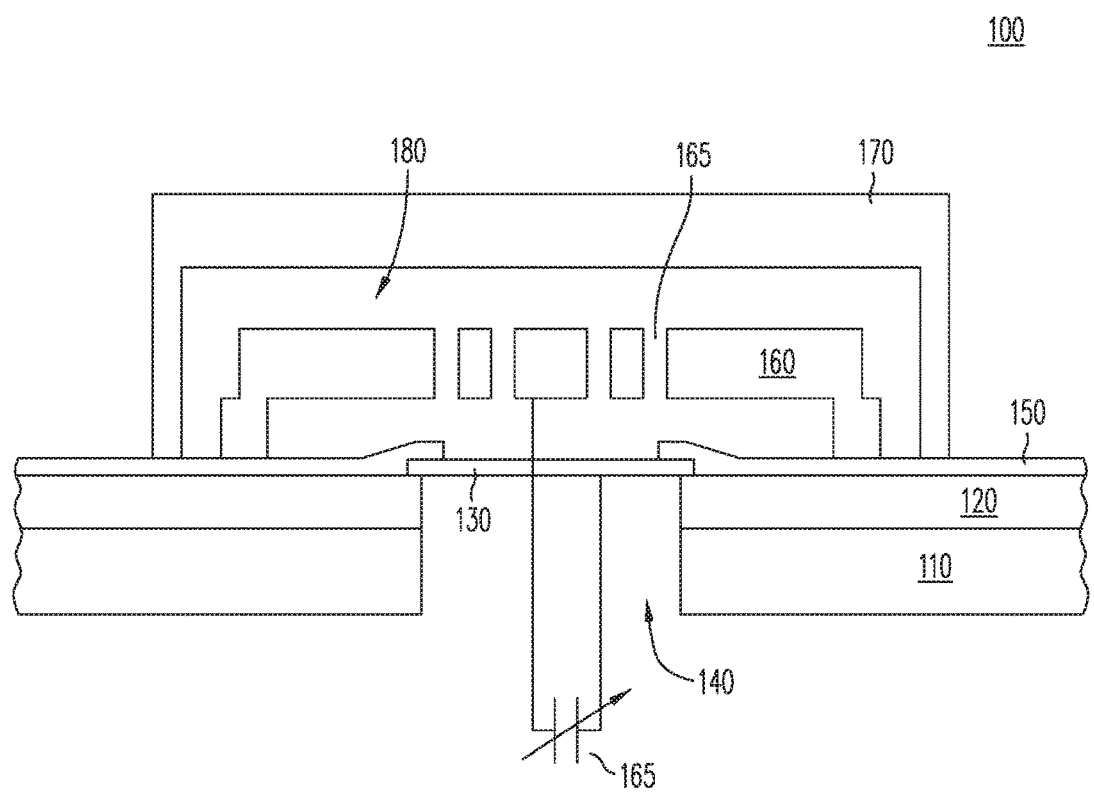
FIG. 1 is a simplified block diagram illustrating a cross sectional side view of a traditional MEMS pressure sensor.

FIG. 1 is a simplified block diagram illustrating a cross sectional side view of a prior art MEMS pressure sensor. MEMS pressure sensor device 100 includes a substrate 110, such as a silicon wafer. The substrates described herein can be any semiconductor material or combinations of materials, such as gallium arsenide, silicon germanium, silicon-on-insulator (SOI), silicon, monocrystalline silicon, the like, and combinations of the above. In some embodiments, a substrate may be a bulk substrate wafer of a semiconductor material. In other embodiments, the substrate may include multiple layers, at least one of which includes a semiconductor material. For example, substrate 110 may, in some cases, include a dielectric layer.

On the top surface of substrate 110 is an insulating layer of silicon oxide 120 formed by, for example, a local oxidation of silicon (LOCOS) process. On top of silicon oxide layer 120 is a diaphragm 130 over a cavity region 140. Diaphragm 130 is formed from, for example, polysilicon and is deformable in response to an external fluid pressure provided to the diaphragm through cavity 140. Diaphragm 130 can be grown or deposited using a conventional or proprietary technique, such as a CVD technique, PVD technique, the like, or any combination thereof. A dielectric layer 150 is formed to electrically isolate diaphragm 130 from other elements of MEMS pressure sensor device 100. Dielectric layer 150 can be formed from a variety of materials, including, for example, silicon nitride, silicon dioxide, silicon oxynitride, and the like.

A reference element 160 is formed over a region including diaphragm 130. Reference element 160 is a mechanical silicon element that can be formed from, for example, polysilicon or silicon formed using a high aspect ratio micro-electromechanical systems process. Reference element 160 can include through-holes 165 that can enable formation of a cavity region above diaphragm 130 during processing, as well as providing a pass-through for a reference pressure to the back side of diaphragm 130. Cap 170 is attached to the top surface of the substrate laminate, thereby providing a hermetically sealed region 180. Cap 170 can be attached to the substrate laminate by a variety of known processing methods, including, for example, glass frit bonding, metal eutectic bonding, and the like. Hermetically sealed region 180 can be provided with a desired reference pressure against which an external pressure is measured.

Diaphragm 130 and reference element 160 form electrodes of a sense capacitor 165. The capacitance of sense capacitor 165 is determined, in part, due to deformation of diaphragm 130 in response to a pressure external to MEMS pressure sensor device 100 acting within cavity region 140. As discussed above, capacitance changes in an inverse relationship to the distance between diaphragm 130 and reference element 160. Thus the relationship between capacitance change and pressure change is non-linear.

Figure 2:
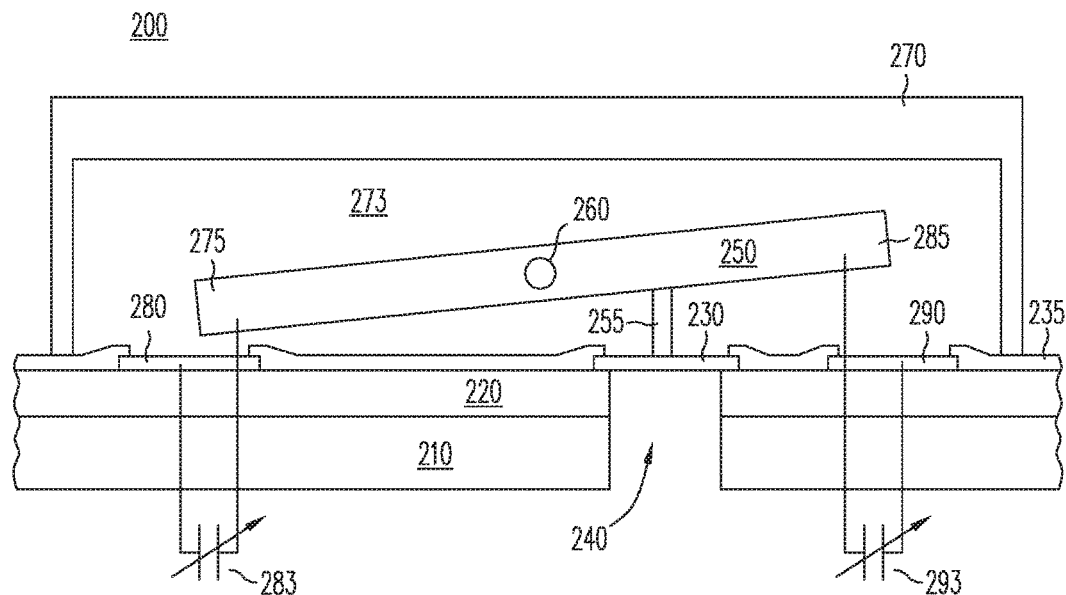
FIG. 2 is a simplified block diagram illustrating a cross-section of a MEMS pressure sensor device, in accord with embodiments of the present invention.

FIG. 2 is a simplified block diagram illustrating a cross-section of a MEMS pressure sensor device 200, in accord with embodiments of the present invention. As illustrated, MEMS pressure sensor device 200 provides a linkage between a diaphragm exposed to pressure external to the pressure sensor device and a rotating proof mass that in turn can provide a differential capacitive output.

A substrate 210 is provided with an insulating layer 220. As with FIG. 1, substrate 210 can be a silicon wafer and insulating layer 220 can be a silicon oxide. Diaphragm 230 is formed on top of insulating layer 220, along with electrodes 280 and 290. Again as with FIG. 1, the layer forming diaphragm 230 and electrodes 280 and 290 can be polysilicon, and can be formed using conventional techniques. A dielectric layer 235 is formed to electrically isolate diaphragm 230 from other elements of MEMS pressure sensor device 100, such as electrodes 280 and 290. Dielectric layer 235 can be formed from a variety of materials, including, for example, silicon nitride, silicon dioxide, silicon oxynitride, and the like.

Diaphragm 230 is deformable in response to a fluid pressure applied to the diaphragm through a region defined by cavity 240. As diaphragm 230 deforms, a linkage 255, coupling the diaphragm and the rotating proof mass, causes a rotating proof mass 250 to rotate around a pivot point 260. A cap 270 is attached to the top surface of the substrate laminate, thereby providing a hermetically sealed region 273. As with the cap from FIG. 1, cap 270 can be attached using a variety of methods.

Movement of diaphragm 230 causes rotating proof mass 250 to move in a manner similar to that of a teeter totter, meaning that when one side rises (e.g., side 275) the opposite side (e.g., side 285) falls. Rotating proof mass 250 can be configured in a manner such that the rotating proof mass is balanced through pivot point 260. This will have an effect of making the device less sensitive, or insensitive, to acceleration as applied to the entire device. An electrode configured from side 285 of the rotating proof mass is associated with a fixed electrode 280 to form a first variable sense capacitor 283. An electrode configured from side 285 of the rotating proof mass is associated with a fixed electrode 290 to form a second variable sense capacitor 293.

Changes in the capacitances of the first and second variable sense capacitors can be combined to provide a differential output from MEMS pressure sensor device 200. One advantage of the differential output is that the signal is a composite of two capacitances and is therefore a stronger signal. Another advantage of the differential output is that the relationship between changes in the differential output in response to changes in an applied external pressure is more linear than that of MEMS pressure sensor device 100.

Fabrication of MEMS pressure sensor device 200 can be performed using known MEMS processes.

Figure 3:
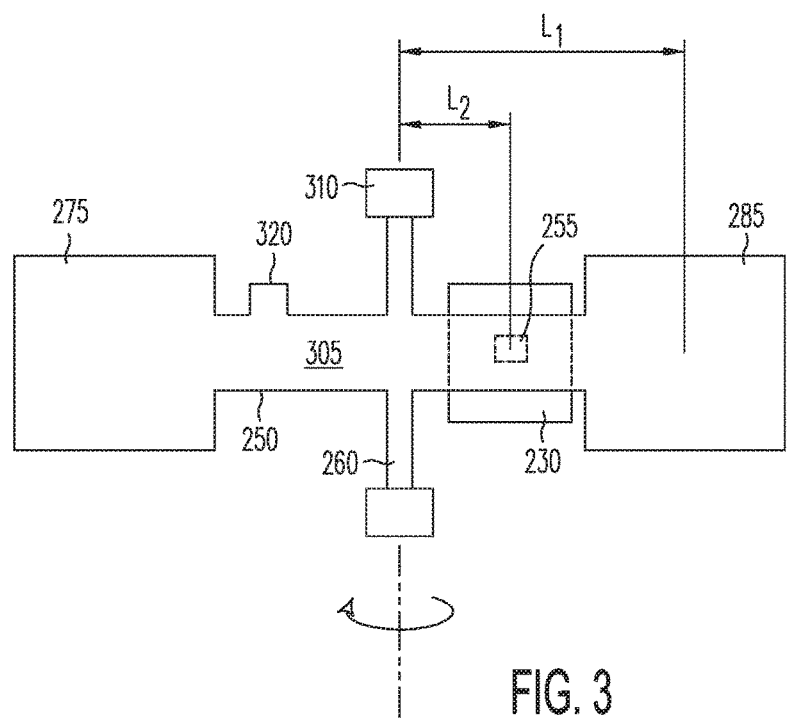
FIG. 3 is a simplified block diagram illustrating a top view of a portion of the MEMS pressure sensor device.

FIG. 3 is a simplified block diagram illustrating a top view of a portion of MEMS pressure sensor device 200. Rotating proof mass 250 is illustrated as having paddles at sides 275 and 285 attached by a bar region 305. Pivot 260 is secured by anchors 310 that permit rotational motion of the rotating proof mass. Diaphragm 230 is illustrated as offset to the right of pivot 260 and attached to the bar region by linkage 255. In one embodiment, a distance L1 from the center of pivot 260 to the center of mass of a paddle at side 285 is approximately 300 microns. In that same embodiment, a distance L2 from the center of pivot 260 to linkage 255 is approximately 100 microns. Since the diaphragm and linkage (and any protective gel applied to the external side of the diaphragm) add weight to one side of the rotating proof mass (e.g., the right side, as illustrated), a balance counterweight 320 can be formed on the opposing side of the rotating proof mass to compensate. The balance counterweight helps to avoid any acceleration effects experienced by the rotating proof mass. This can be a consideration for applications such as a tire pressure monitoring system, where a pressure sensor device can experience a variety of accelerations.

The embodiment of FIGS. 2 and 3 allows for measurement of a pressure external to MEMS pressure sensor device 200. But this embodiment may not be ideal for measuring differences between multiple pressures. Further, additional packaging techniques, such as overmolding, may cause a variety of stresses on the movable structures that alter behavior. The following embodiments can address some of these issues.

Figure 4:
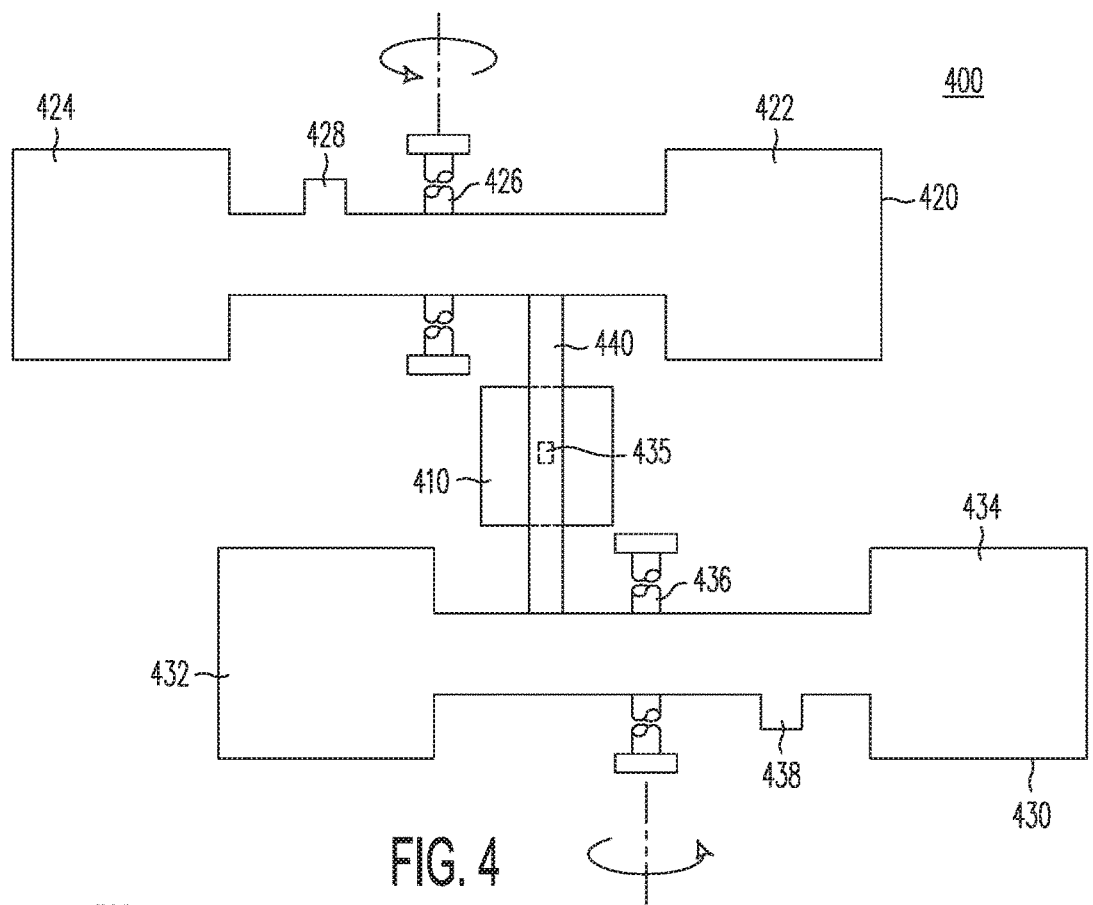
FIG. 4 is a simplified block diagram illustrating a top view of an alternative embodiment of a MEMS pressure sensor device.

FIG. 4 is a simplified block diagram illustrating a top view of an alternative embodiment of MEMS pressure sensor device 400, in accord with embodiments of the present invention. A diaphragm 410 that is responsive to external pressures can cause movement of two rotating proof masses 420 and 430. Diaphragm 410 is coupled to the two rotating proof masses via a pair of linkages 435 and 440. As diaphragm 410 is deformed by external pressure, the rotating proof masses rotate in opposite directions. The configuration of rotating proof masses 420 and 430 are similar to that of rotating proof mass 250 illustrated in FIG. 3. Rotating proof mass 420 has paddles at opposing ends 422 and 424 and rotates about a pivot 426. In addition, a counterweight 428 is provided to counterbalance the weight effects of diaphragm 410, and linkages 435 and 440. Similarly, rotating proof mass 430 has paddles at opposing ends 432 and 434 and rotates about a pivot 436, and has a counterweight 438.

One advantage of the embodiment illustrated as MEMS pressure sensor device 400 is that any stresses imposed upon the device package by subsequent processing (e.g., overmolding), temperature variations, and the like, can be countered by the equal and opposite movement of the two rotating proof masses. This can result in reducing or eliminating effects of stress upon measurements taken by the pressure sensor device. Another advantage of this embodiment is an increase in signal strength of the pressure sensor device because there are multiple sense capacitors formed by the rotating proof masses. A processing device, such as an application specific integrated circuit (ASIC), can be configured to receive and aggregate the various capacitances to more accurately determine external pressure effects than in a single rotating proof mass configuration. Further this can be done without an increase in the external port size leading to diaphragm 410 (e.g., the cavity formed in the substrate), or multiple diaphragms to receive the external pressure.

Figure 5:
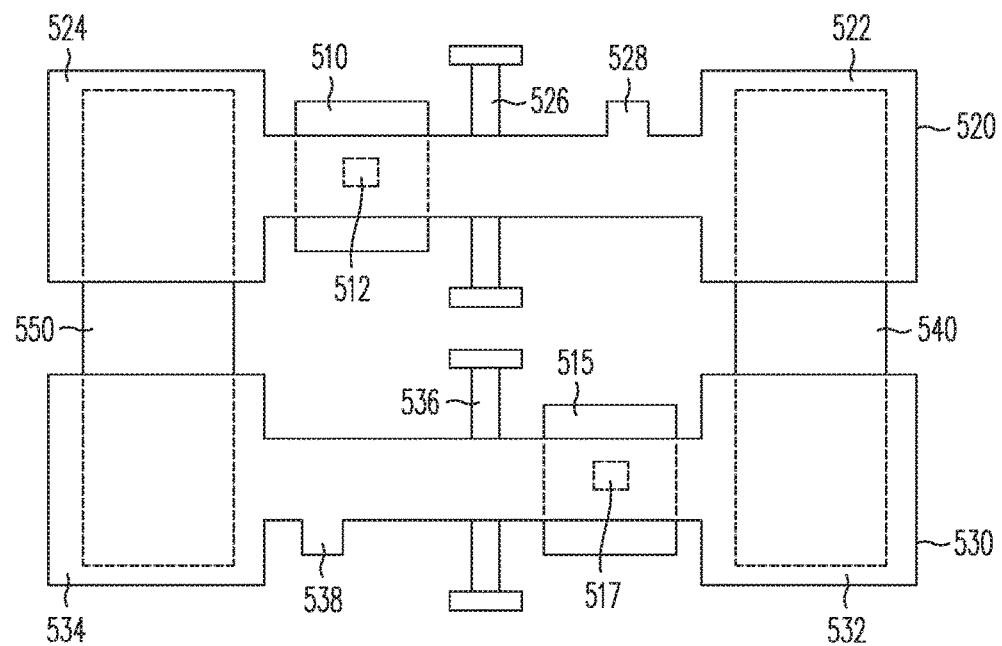
FIG. 5 is a simplified block diagram illustrating a top view of another alternative embodiment of a MEMS pressure sensor device that provides capability for measuring differential pressure.

FIG. 5 is a simplified block diagram illustrating a top view of an alternative embodiment of MEMS pressure sensor device 500 that provides capability for measuring differential pressure, in accord with embodiments of the present invention. As with MEMS pressure sensor device 400, a pair of rotating proof masses are provided. In this case, however, two diaphragms 510 and 515 are provided, and each is associated with a separate rotating proof mass 520 and 530, respectively. By virtue of having two diaphragms, different pressures can be applied to each diaphragm and a differential pressure can be measured.

Each rotating proof mass configuration provided in FIG. 5 is similar to that illustrated in FIG. 3. For example, rotating proof mass 520 includes paddles at each of ends 522 and 524 and rotates about a pivot 526, and has a counterweight 528 to compensate for weight associated with diaphragm 510 and a linkage 512 along with any additional encumbrances such as gel. Similarly, rotating proof mass 530 includes paddles at each of ends 532 and 534 and rotates about a pivot 536, and has a counterweight 538 to compensate for wind associated with diaphragm 515 and linkage 517, along with any additional encumbrances.

In the illustrated embodiment, the two rotating proof mass configurations share fixed bottom electrodes 540 and 550 at each end. Alternate embodiments provide separate fixed bottom electrodes for the two rotating proof masses. It should be understood that processing of signals provided by the variable sensing capacitors formed by the rotating proof masses and fixed electrodes will vary depending upon the configuration of the various electrodes. Design of the processor interpreting the signals (e.g., an ASIC) will be coupled with the design of the MEMS pressure sensing device.

MEMS pressure sensor device 500 is configured to measure a differential pressure between a pressure exposed to diaphragm 510 and a pressure exposed to diaphragm 515. As illustrated, the rotating proof masses are configured to rotate in opposite directions in response to increased pressure at the diaphragms. As with MEMS pressure sensor device 400, the opposite rotation of the rotating proof masses can cancel package stress. In addition to measuring a differential between two different pressures, MEMS pressure sensor device 500 can also be used to provide a reference cell for compensating package stress. The reference cell could have zero pressure sensitivity by, for example, putting a hole in a diaphragm or providing no cavity below the diaphragm.

Figure 6:
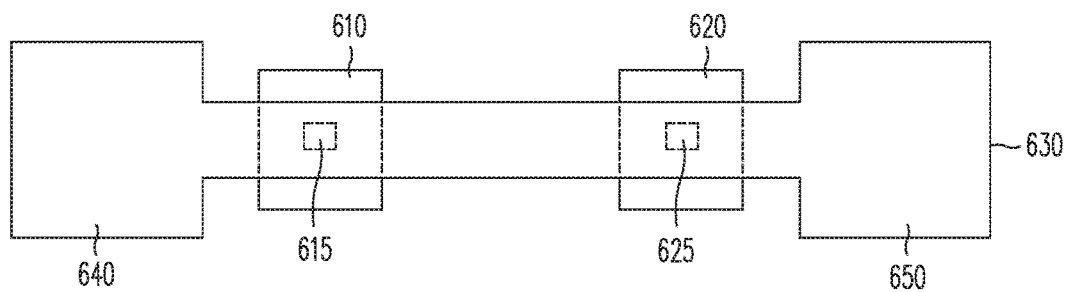
FIG. 6 is a simplified block diagram illustrating a top view of another alternative embodiment of a MEMS pressure sensor device providing two diaphragms with a single rotating proof mass.

FIG. 6 is a simplified block diagram illustrating a top view of an alternative embodiment of a MEMS pressure sensor device providing two diaphragms with a single rotating proof mass. Diaphragms 610 and 620 are coupled to rotating proof mass 630 by linkages 615 and 625, respectively. As with previous embodiments, diaphragms 610 and 620 are configured to be deformable in response to changes in pressure external to MEMS pressure sensor device 600. As illustrated, paddles are formed at end 640 and 650 of rotating proof mass 630. All or a portion of these paddles can be configured as electrodes for variable capacitors, as will be discussed more fully below.

Figure 7:
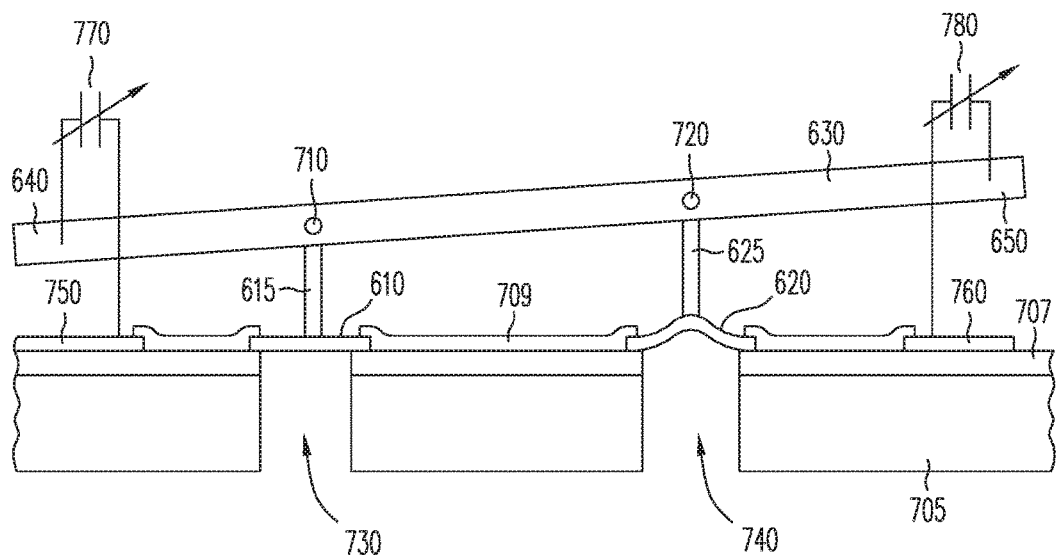
FIG. 7 is a simplified block diagram illustrating a cross-sectional view of the MEMS pressure sensor device illustrated in FIG. 6.

FIG. 7 is a simplified block diagram illustrating a cross-sectional view of MEMS pressure sensor device 600, in accord with the alternative embodiment illustrated in FIG. 6. As with previously discussed embodiments, a substrate 705 is provided, which can be formed from a silicon wafer, for example. On the top surface of substrate 705 is an insulating layer 707, such as silicon oxide. The diaphragms 610 and 620 are formed on top of the oxide layer along with electrodes 750 and 760, which form the fixed portion of the sense capacitors, as will be discussed more fully below. The layer forming the diaphragms and electrodes can be formed of, for example, polysilicon. A dielectric layer 709 is formed to electrically decouple the diaphragms from the electrodes and the like. Dielectric layer 709 can be formed from a variety of dielectric materials, as appropriate to the application. As discussed above, diaphragms 610 and 620 are coupled to rotating proof mass 630 by linkages 615 and 625, respectively. Linkages 615 and 625 can be coupled to the rotating proof mass by a pivot arrangement 710 and 720. By coupling the linkages through a pivot point, this allows the rotating proof mass to independently rotate in response to displacement of each diaphragm caused by external pressures. External pressures can be applied to diaphragms 610 and 620 through cavities 730 and 740, respectively, formed in the substrate.

Electrodes can be formed at end 640 and 650 of rotating proof mass 630, which are associated with fixed electrodes 750 and 760, in order to form variable capacitors 770 and 780, respectively. Signals from these variable capacitors can be used to evaluate differential pressure between the pressures applied through cavities 730 and 740.

FIG. 8 is a simplified block diagram illustrating a tire pressure monitoring system 800, usable in association with embodiments of the present invention. A TPMS is one example of a use of a pressure sensor device embodying the present invention. Tire pressure monitoring system (TPMS) 800 includes two portions: a wheel module 805 and a receiver portion 855. Wheel module 805 is typically located within one or more tires on a vehicle, while receiver portion 845 is contained outside of the tires.

Wheel module 805 includes a power management circuit 810 that is coupled to a power supply for the wheel module. Power management circuit 810 separately powers and analogue interface 815, a process controller 835, and a radio frequency (RF) transmitter 840. Further, a pressure sensor 820, a temperature sensor 825, and one or more miscellaneous sensors 830 can receive power either directly from power management circuit 810 or through analogue interface 815. An input output of pressure sensor 820 is connected to a first signal input/output of analog interface 815. An input output of temperature sensor 825 is connected to a second signal input/output of analog interface 815. An input/output of miscellaneous sensor 830 is connected to a third signal input/output of analog interface 815. Analog interface 815 is further connected to an input/output of process controller 835. And input/output of process controller 835 is coupled to an input/output of RF transmitter 840. RF transmitter 840 has an antenna for transmitting and RF signal that is received by an antenna of RF receiver 850. Examples of frequencies used as the RF frequency are, by way of example only, from 300 MHz to 1 GHz.

Receiver portion 845 includes RF receiver 850, a processor 855 and a display 860. An output of RF receiver 850 is connected to an input of processor 855. Display 860 is connected to an output of processor 855.

In operation, wheel module 805 is mounted within a vehicle tire. Pressure sensor 820 functions to sense the tires pressure when the pressure sensor is powered. Pressure sensor 820 can include an embodiment of the present invention such as that illustrated in FIGS. 2 and 3. Similarly, temperature sensor 825 functions to sense the temperature of the air within the tire when the temperature sensor is powered. The temperature measurement can be done using variable capacitance, variable resistance, or a diode voltage. Miscellaneous sensors 830 can be configured to measure additional environmental and performance data, as needed. Analog interface 815 functions to perform an analog-to-digital conversion of the outputs of the various sensors. Additionally, analog interface 815 can perform other functions, such as providing clock synchronization and control signals to the sensors, providing reference voltages and performing correction of sensor errors and nonlinearity errors associated with the pressure and temperature measurements, and interpreting differential capacitance measurements provided by the sensors. Process controller 835 can be configured to gather pressure and temperature measurements at a given time interval and send that data via RF transmitter 840 at a second time interval. Further, in order to manage battery power within the wheel module, process controller 835 can selectively connect and disconnect power source from the other components of the wheel module using the power management circuit. Power management circuit 810 can include power saving logic and functionality incorporated therein to implement various low-power modes and timing sense parameters.

Process controller 835 can additionally contain logic circuitry or software code in a memory for purpose of identifying, based solely on the pressure and temperature of the tire, or in response to one or more of the miscellaneous sensors, when the tire is in motion. In response to determining whether the tire is in motion, process controller 835 can provide control over all battery power consumption as determined by the rate of measurement by the various sensors and the transmission rate of RF transmitter 840. Process controller 835 can monitor the tire pressure level indicated by pressure sensor 820 and provide a low or high pressure alarm signal to RF transmitter 840, when the tire pressure reaches or falls below a predetermined value or reaches or rises above a second predetermined value. The pressure alarm signal is received by RF receiver 850 and is processed by processor 855 to signal a user of the vehicle that the tire pressure has fallen below or risen above the predetermined values. For example, when processor 855 detects that an air leak exists (e.g., that the tire pressure has fallen below a predetermined threshold), and alarm, either visible or audible, is sent to display 860. Processor 855 can be implemented as a microcontroller with programmable memory such as a ROM for storing software or as a state machine with hardware logic to implement the method discussed.

In this manner, a variety of pressure sensor configurations can be made that provide differential signals through the use of multiple variable sense capacitors. Further, these pressure sensor configurations provide a more linear signal in response to changes in pressure external to the pressure sensor. In both cases, processing of the signals generated by these pressure sensors becomes more uniform in relation to other types of sensors used in, for example, tire pressure monitoring systems, such as temperature and acceleration sensors. This, in turn, allows for simplification of processor design.

By now it should be appreciated that there has been provided a MEMS pressure sensor that includes: a rotating proof mass having a movable element adapted for motion relative to a rotational axis offset between first and second ends to form a first section between the rotational axis and the first end and a second section between the rotational axis and the second end, the first section includes an extended portion spaced away from the rotational axis, and the second section includes an extended portion spaced away from the rotational axis at a length of approximately equal to a length of the extended portion of the first section such that the rotational axis is at a center of mass of the movable element; a diaphragm configured to deform in response to a first fluid pressure external to a package that includes the diaphragm and the rotating proof mass; and, a linkage configured to couple a surface of the diaphragm internal to the package to a point along the first section of the rotating proof mass where the rotating proof mass rotates in response to deformation of the diaphragm.

In one aspect of the above embodiment, the second section of the movable element further includes a counterweight that offsets the weight of the diaphragm and linkage so as to maintain the center of mass of the coupled movable element, linkage and diaphragm at the rotational axis. Another aspect of the above embodiment further includes: the rotating proof mass further having a first major surface and a second major surface; a first movable element electrode placed on the first major surface of the first section of the movable element at a first distance from the rotational axis; a second movable element electrode placed on the first major surface of the second section of the movable element at a second distance from the rotational axis; a first fixed electrode placed on a fixed surface of the package in a location opposing the first movable element electrode; and, a second fixed electrode placed on the fixed surface of the package in a location opposing the second movable element electrode. The first movable element electrode is electrically isolated from the second movable element electrode. The first fixed electrode is electrically isolated from the second fixed electrode. The first movable element electrode and the first fixed electrode form a first variable capacitor. The second movable element electrode and the second fixed electrode form a second variable capacitor. In a further aspect, the MEMS pressure sensor further includes a processor that is coupled to the first and second variable capacitors. The processor is configured to measure a difference between a first capacitance of the first variable capacitor and a second capacitance of the second variable capacitor where the first and second capacitances are responsive to the first fluid pressure external to the package as applied to the diaphragm.

Another aspect of the above embodiment further includes a second rotating proof mass. The second rotating proof mass includes: a second movable element adapted for motion relative to a second rotational axis offset between third and fourth ends thereof to form a third section between the rotational axis and the third end and a fourth section between the rotational axis and the fourth end; the third section includes an extended portion spaced away from the second rotational axis; and, the fourth section includes an extended portion spaced away from the second rotational axis at a length of approximately equal to a length of the extended portion of the third section such that the second rotational axis is at a center of mass of the second movable element.

A further aspect includes a second linkage configured to couple the surface of the diaphragm internal to the package to a point along the third section of the second rotating proof mass. The second rotating proof mass is configured to rotate in response to deformation of the diaphragm and rotation of the second rotating proof mass is in an opposite rotational direction to that of the rotating proof mass. Another further aspect includes: a second diaphragm configured to deform in response to a second fluid pressure external to the package where the second fluid pressure is associated with a second fluid source distinct from a first fluid source associated with the first fluid pressure; and, a second linkage configured to couple a surface of the second diaphragm internal to the package to a point along the third section of the second rotating proof mass where the second rotating proof mass is configured to rotate in response to deformation of the second diaphragm. In a further aspect of the above aspect, a rotation of the second rotating proof mass is in an opposite rotational direction to that of the rotating proof mass in response to an increase in pressure experienced by the second diaphragm.

Another further aspect of the above aspect includes: the rotating proof mass having a first major surface and the second major surface; a first movable element electrode placed on the first major surface of the first section of the movable element at a first distance from the rotational axis; a second movable element electrode placed on the first major surface of the second section of the movable element at a second distance from the rotational axis; the second rotating proof mass further having a third major surface and a fourth major surface; a third movable element electrode placed on the third major surface of the third section of the movable element of the third distance from the rotational axis; a fourth movable element electrode placed on the third major surface of the fourth section of the movable element at a fourth distance from the rotational axis; a first fixed electrode placed on fixed surface of the package in a location opposing the first movable element electrode and the fourth movable element electrode; and, a second fixed electrode placed on the fixed surface of the package in a location opposing the second movable element electrode and the third movable element electrode. The first movable element electrode is electrically isolated from the second movable element electrode. The third movable element electrode is electrically isolated from the fourth movable element electrode. The first fixed electrode is electrically isolated from the second fixed electrode. The first movable element electrode and the first fixed electrode form a first variable capacitor. The second movable element electrode and the second fixed electrode form a second variable capacitor. The third movable element electrode and the second fixed electrode form a third variable capacitor. The fourth movable element electrode and the first fixed electrode form a fourth variable capacitor. In a further aspect of this aspect, the MEMS pressure sensor further includes a processor coupled to the first, second, third, and fourth variable capacitors. The processor is configured to measure a difference between a first capacitance of the first variable capacitor and a second capacitance of the second variable capacitor and measure a difference between a third capacitance of the third variable capacitor and a fourth capacitance of the fourth variable capacitor. The first and second capacitances are responsive to the first fluid pressure external to the package as applied to the diaphragm, and the third and fourth capacitances are responsive to the second fluid pressure external to the package as applied to the second diaphragm. In a further aspect of this aspect, the processor is further configured to determine a difference between the first fluid pressure and the second fluid pressure using the first, second, third, and fourth capacitances.

In another aspect, the second diaphragm and second linkage are configured such that the second linkage does not move in response to deformation of the second diaphragm.

Another embodiment provides a tire pressure monitoring system having a wheel module configured to be mounted in a vehicle tire. The wheel module includes a process controller configured to process signals from one or more sensors, a MEMS pressure sensor coupled to the process controller, and a RF transmitter coupled to the process controller and configured to transmit sensor information provided by the process controller. The MEMS pressure sensor includes: a rotating proof mass having a movable element adapted for motion relative to a rotational axis offset between first and second ends thereof to form a first section between the rotational axis and the first end and a second section between the rotational axis and the second end, the first section includes an extended portion spaced away from the rotational axis, and the second section includes an extended portion spaced away from the rotational axis of a length approximately equal to a length of the extended portion of the first section such that the rotational axis is at a center of mass of the movable element; a diaphragm configured to perform in response to a gas pressure of the vehicle tire; and, a linkage configured to couple a surface of the diaphragm internal to the package to a point along the first section of the rotating proof mass where the rotating proof mass is configured to rotate in response to deformation of the diaphragm.

In a further aspect of the above embodiment, the MEMS pressure sensor of the tire pressure monitoring system further includes: the rotating proof mass further having a first major surface and a second major surface; a first movable element electrode placed on the first major surface of the first section of the movable element at a first distance from the rotational axis; a second movable element electrode placed on the first major surface of the second section of the movable element at a second distance from the rotational axis; a first fixed electrode placed on a fixed surface of the package in a location opposing the first movable element electrode; and, a second fixed electrode placed on the fixed surface of the package in a location opposing the second movable element electrode. The first movable element electrode is electrically isolated from the second movable element electrode. The first fixed electrode is electrically isolated from the second fixed electrode. The first movable element electrode and the first fixed electrode form a first variable capacitor. The second movable element electrode and the second fixed electrode form a second variable capacitor. The process controller is further configured to measure a difference between a first capacitance of the first variable capacitor and a second capacitance of the second variable capacitor, where the first and second capacitances are responsive to the gas pressure of the vehicle tire as applied to the diaphragm. In a further aspect, the MEMS pressure sensor is insensitive to acceleration forces caused by rotation of the vehicle tire.

Another embodiment includes a MEMS pressure sensor having a rotating proof mass, a first diaphragm configured to perform in response to a first fluid pressure external to a package comprising the first diaphragm and the rotating proof mass, a second diaphragm configured to perform in response to a second fluid pressure external to the package, a first linkage configured to couple a surface of the first diaphragm internal to the package to a first pivot point at a first rotational axis of the rotating proof mass, and a second linkage configured to couple a surface of the second diaphragm internal to the package to a second pivot point at a second rotational axis of the rotating proof mass. The rotating proof mass includes: a movable element adapted for motion relative to first and second rotational axes offset between first and second ends and from the other rotational axis; a first section of the movable element is formed between the first rotational axis and the first end and includes an extended portion spaced away from the first rotational axis and the second rotational axis; a second section of the movable element is formed between the second rotational axis and the second end and includes an extended portion spaced away from the second rotational axis and the first rotational axis; a length of the extended portion of the second section is approximately equal to a length of the extended portion of the first section; and, a third section is formed between the first rotational axis and the second rotational axis.

In one aspect of the above embodiment the MEMS pressure sensor further includes: the rotating proof mass further having a first major surface and a second major surface; a first movable element electrode placed on the first major surface of the first section of the movable element at a first distance from the first rotational axis; a second movable element electrode placed on the first major surface of the second section of the movable element at a second distance from the second rotational axis; a first fixed electrode placed on a fixed surface of the package in a location opposing the first movable element electrode; and, a second fixed electrode placed on the fixed surface of the package in a location opposing the second movable element electrode. The first movable element electrode is electrically isolated from the second movable element electrode. The first fixed electrode is electrically isolated from the second fixed electrode. The first movable element electrode and the first fixed electrode form a first variable capacitor. The second movable element electrode and the second fixed electrode form a second variable capacitor. In a further aspect, the MEMS pressure sensor further includes a processor coupled to the first and second variable capacitors. The processor is configured to measure a difference between the first capacitance of the first variable capacitor and a second capacitance of the second variable capacitor. The first and second capacitances are responsive to the first fluid pressure external to the package as applied to the first diaphragm and the second fluid pressure external to the package as applied to the second diaphragm.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 8 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of modules in system 800 are circuitry located on a single integrated circuit or within a same device. Alternatively, system 800 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, different shapes and sizes of rotating proof masses can be used, provided there is a balance through a rotating proof mass being used. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A micro electro-mechanical system (MEMS) pressure sensor comprising:

a rotating proof mass, wherein the rotating proof mass comprises
  a moveable element adapted for motion relative to first and second rotational axes offset between first and second ends and from the other rotational axis,
  a first section of the moveable element is formed between the first rotational axis and the first end and comprises an extended portion spaced away from the first rotational axis and the second rotational axis,
  a second section of the moveable element is formed between the second rotational axis and the second end and comprises an extended portion spaced away from the second rotational axis and the first rotational axis,
  a length of the extended portion of the second section is approximately equal to a length of the extended portion of the first section, and
  a third section is formed between the first rotational axis and the second rotational axis;
a first diaphragm configured to deform in response to a first fluid pressure applied to a first side of the first diaphragm;
a second diaphragm configured to deform in response to a second fluid pressure applied to a first side of the second diaphragm;
a first linkage configured to couple a second surface of the first diaphragm to a first pivot point at the first rotational axis, wherein the second surface of the first diaphragm is opposite to the first surface of the first diaphragm; and
a second linkage configured to couple a second surface of the second diaphragm to a second pivot point at the second rotational axis, wherein the second surface of the second diaphragm is opposite to the first surface of the second diaphragm.

2. The MEMS pressure sensor of claim 1 further comprising:
  the rotating proof mass further comprising a first major surface and a second major surface;
  a first moveable element electrode placed on the first major surface of the first section of the moveable element at a first distance from the first rotational axis;
  a second moveable element electrode placed on the first major surface of the second section of the moveable element at a second distance from the second rotational axis;
  a first fixed electrode placed on a fixed surface in a location opposing the first moveable element electrode;
  a second fixed electrode placed on the fixed surface in a location opposing the second moveable element electrode, wherein
    the first moveable element electrode is electrically isolated from the second moveable element electrode,
    the first fixed electrode is electrically isolated from the second fixed electrode,
    the first moveable element electrode and the first fixed electrode form a first variable capacitor, and
    the second moveable element electrode and the second fixed electrode form a second variable capacitor.

3. The MEMS pressure sensor of claim 2 further comprising:
  a processor, coupled to the first and second variable capacitors, and configured to measure a difference between a first capacitance of the first variable capacitor and a second capacitance of the second variable capacitor, wherein the first and second capacitances are responsive to the first fluid pressure as applied to the first diaphragm and the second fluid pressure as applied to the second diaphragm.

* * * * *